Oct. 10, 1967 T. C. BAKER 3,346,171
COMBINED PAPERBOARD AND PLASTIC EGG CARTON
Original Filed Sept. 7, 1965 3 Sheets-Sheet 3

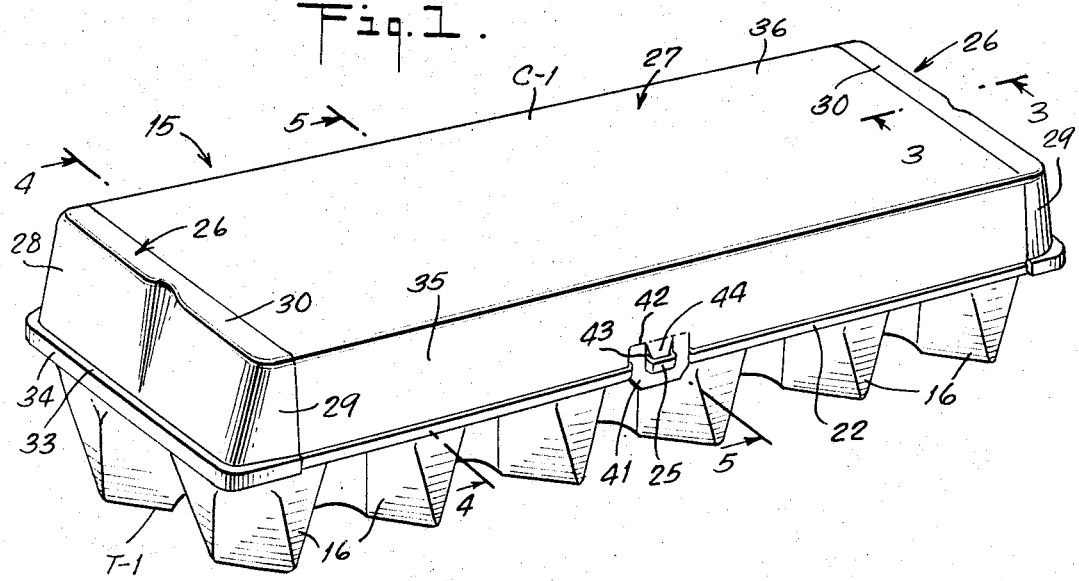
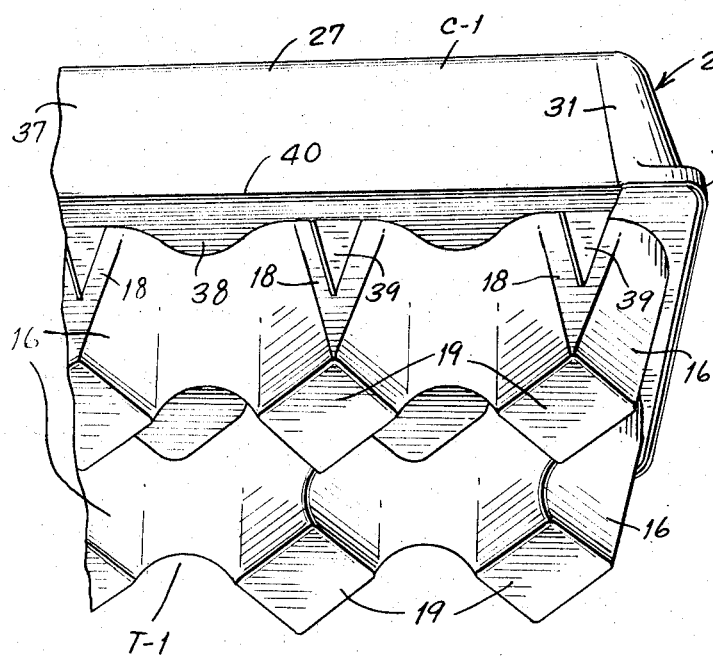
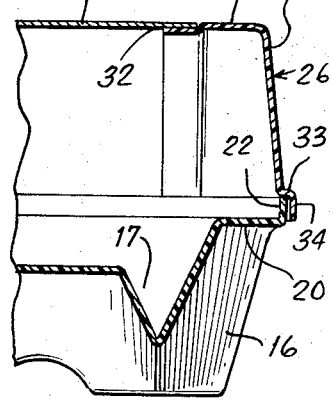

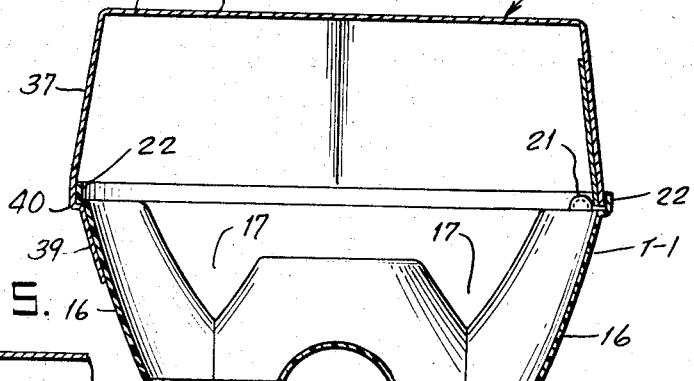
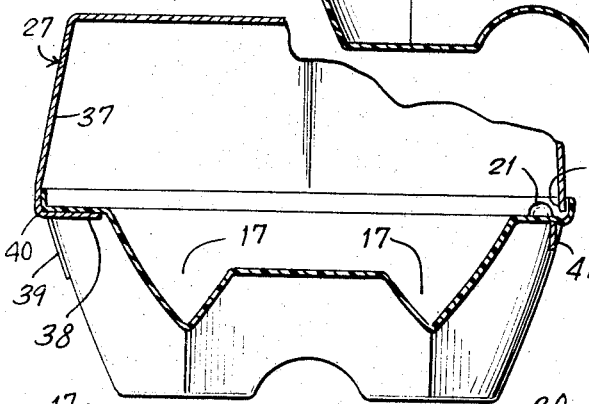
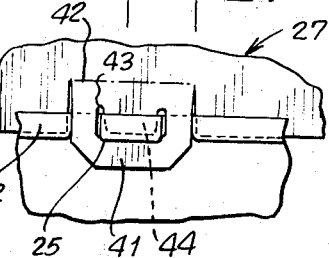
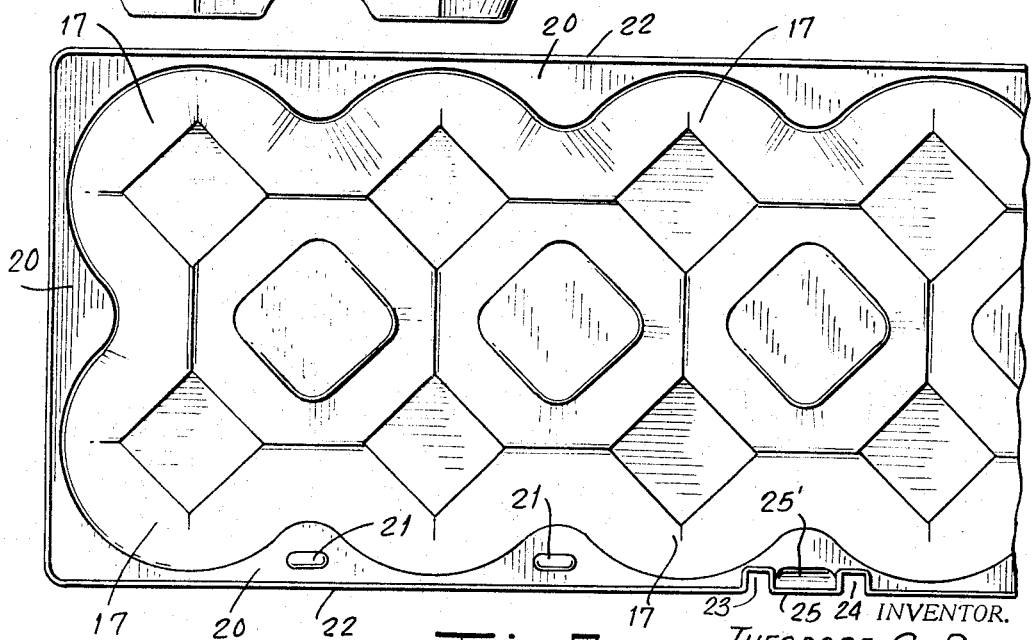

INVENTOR.
THEODORE C. BAKER
BY F. J. Pisarra
ATTORNEY

United States Patent Office 3,346,171
Patented Oct. 10, 1967

3,346,171
COMBINED PAPERBOARD AND PLASTIC EGG CARTON
Theodore C. Baker, 1179 Ponus Ridge,
New Canaan, Conn. 06840
Continuation of application Ser. No. 485,298, Sept. 7, 1965. This application Dec. 1, 1966, Ser. No. 598,516
16 Claims. (Cl. 229—44)

This is a continuation of application Ser. No. 485,298, filed Sept. 7, 1965 and now abandoned.

This invention relates to cartons for containing and storing eggs and the like and having improved features of design and construction.

This invention pertains, more particularly, to a novel carton construction which is especially useful for packaging eggs, which is lightweight and attractive in design, which is reasonable in manufacturing cost, which is provided with a plurality of egg-receiving cavities or cells that are arranged in multiple parallel rows, which affords adequate protection to the eggs during handling and while in storage, which permits of ready visual inspection of the contents of the carton while the parts thereof are in closed position, and which meets present day requirements for high fidelity, full color reproduction of desired printed intelligence, such as advertising text, pictorial representations, trademarks and the like, on its cover.

While the carton of this invention is particularly suitable for containing and storing eggs, it will be appreciated that it may also be advantageously employed to contain and store various other products and articles, including, without limitation, such diverse products as molded candy, fragile Christmas tree ornaments and golf balls.

Cellular egg cartons, made of molded pulp, have been used extensively for a number of years, mainly because of low unit cost and the fact that they provide reasonable protection to eggs under normal use conditions. Although molded pulp cartons are generally satisfactory, it has long been recognized that they possess a number of inherent objections, disadvantages and limitations. For one thing, such cartons do not always provide sufficient strength and rigidity in loaded condition, especially when damp or moist, and, as a consequence, they frequently collapse in the course of handling. Also, such cartons, due to their composition, can not be readily and properly surface printed in one or more colors to meet the increasing trade demand for full color reproductions. As a result, labels bearing full color intelligence must be applied to each carton. This is quite expensive and is reflected in substantial increases in manufacturing costs and selling prices of cartons having such labels.

Attempts have been made, in recent years, to develop and promote the use of egg cartons which are composed entirely of plastic material. None of these attempts has been commercially successful. While most known all-plastic egg cartons possess adequate strength and rigidity, they are so expensive in material and manufacturing costs that they are not economically competitive with molded pulp cartons. Plastic cartons, as in the case of molded pulp cartons, can not be readily, properly and inexpensively printed in one or more colors. Here again, it is usually necessary to apply labels bearing desired printed intelligence to individual cartons.

As will be evident to persons trained in the art from the detailed description appearing further along herein and the annexed drawings, egg cartons constructed in accordance with this invention are devoid of the objections and difficulties mentioned above and, at the same time, retain all of the desirable attributes and characteristics of molded pulp cartons and all-plastic cartons. Moreover, the subject egg carton, by virtue of employing a suitable synthetic plastic composition for certain parts and paperboard for another part, which parts are constructed and arranged in the manner hereinafter described, is economically competitive with and affords a number of worthwhile benefits and advantages as compared to generally similar conventional cartons.

It is the primary object of this invention to provide a carton having improved features of design and construction.

Another object of this invention is to provide an improved multi-cell carton which is commercially competitive with and devoid of the objections to similar known cartons.

This invention has for another object the provision of a carton for containing eggs and the like and comprising a plastic tray unit and a cover unit which is hinged to and readily severable from the tray unit, the cover unit consisting of a pair of spaced, transparent, plastic end parts which permit of convenient visual inspection of the contents of the carton and an intermediate paperboard part which is adapted to bear and effectively display printed decorative and/or advertising material.

A further object of this invention is to provide a carton of the character indicated which is lightweight and attractive in design, which is sturdy and durable in construction, which is reasonable in manufacturing cost, which is adapted to be readily stacked in unloaded open condition and in loaded closed condition, and which is capable of performing its intended functions in an entirely satisfactory manner.

The foregoing objects are successfully attained by a carton constructed in accordance with this invention and comprising a pair of units, namely a tray unit and a cover unit which is mounted on and pivotal relative to the tray unit. The tray unit is of molded one-piece construction, having bottom, front, rear and side walls, and provided with a plurality of receptacles which extend upwardly from the bottom wall and define corresponding egg-receiving cells. The tray unit has a top wall which projects laterally beyond at least the front and side walls. The cover unit is hollow and open at the bottom and comprises a pair of spaced, plastic end parts and an intermediate paperboard part which is secured at each end to a corresponding end part. The end and intermediate parts of the cover unit form its top, front, rear and side walls. The paperboard part includes a panel which is hinged to the rear wall of the cover unit along a weakened line and is secured to the rear portion of the tray unit. The weakened hinge line permits of ready detachment of the cover unit, except for the panel, from the tray unit.

The carton includes an improved and simplified latching means consisting of a catch member carried by the tray unit and a latch member which is integral with the paperboard part of the cover unit, as will be described in greater detail further along herein.

The tray unit and the end parts of the cover unit are made of a suitable synthetic plastic composition, preferably polystyrene. The tray unit is preferably formed by vacuum or pressure molding a sheet of high impact polystyrene to provide requisite strength, rigidity, smoothness, etc. It has been ascertained that tray units, which are pressure or vacuum formed, as indicated, and having a thickness between about 8 and 20 mils, are entirely suitable and represent economic use of the polystyrene.

The end parts of the cover unit are preferably made by injection molding transparent polystyrene. The end parts contribute substantially to the strength and rigidity of the cover unit and permit visual inspection of the contents of the carton with the cover unit in closed position relative to the tray unit.

The paperboard part of the cover unit is so configured and arranged relative to the plastic end parts as to also contribute substantially to the strength and rigidity of the cover unit. The entire outer surface of the paperboard part may be printed, prior to attachment to the end parts, with a desired decorative and/or advertising material, in any selected color or colors. Moreover, the use of paperboard, as the material of a major portion of the carton, results in worthwhile economies in manufacturing cost.

The enumerated objects and additional objects, together with the advantages of this invention, will be readily understood by persons versed in the art from the following detailed description and the annexed drawings which describe and illustrate two recommended carton constructions which embody the invention.

In the drawings wherein like reference characters denote corresponding parts throughout the several views:

FIG. 1 is an isometric view of a complete carton constructed in accordance with this invention;

FIG. 2 is a fragmentary view, in isometric enlargement, of an end portion of the carton shown in FIG. 1, as seen from a position to the rear of and below FIG. 1;

FIG. 3 is an enlarged fragmentary view taken along line 3—3 of FIG. 1;

FIG. 4 is a view in enlargement taken along line 4—4 of FIG. 1;

FIG. 5 is a view in enlargement taken along line 5—5 of FIG. 1;

FIG. 6 is an enlarged view of a latch means which is also shown in FIG. 1;

FIG. 7 is an enlarged top plan view of a portion of the tray unit of the carton shown in FIG. 1;

Figure 8:
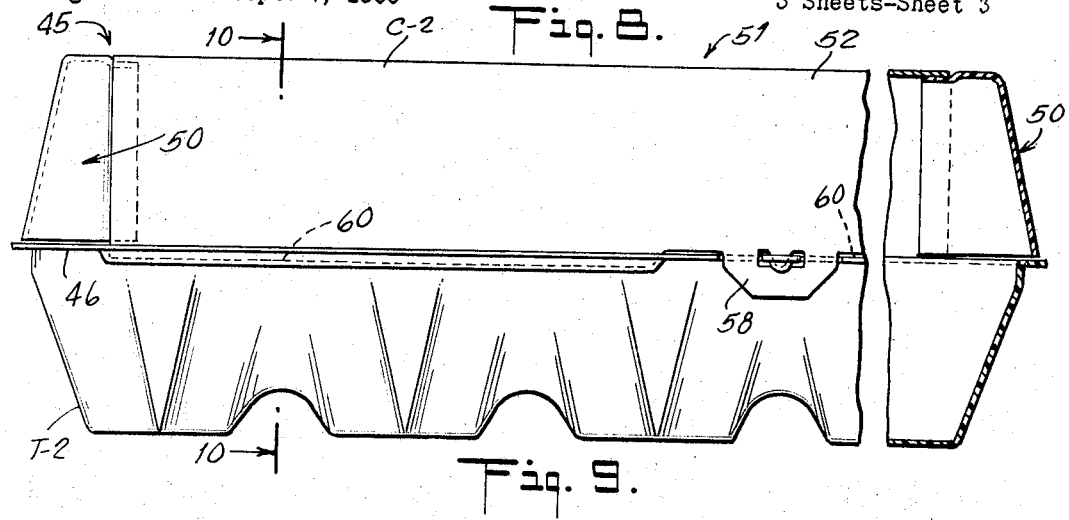
FIG. 8 is a front elevation view of another carton according to the invention.

Reference is first had to FIGS. 1 through 7 which illustrate one embodiment 15 of a complete egg carton according to this invention and consisting of a pair of units, namely a bottom or tray unit T-1 and a top or cover unit C-1.

Tray unit T-1 is made by molding a suitable plastic composition of the character referred to earlier herein to form a plurality of interconnected receptacles 16 which define corresponding pockets or cells 17 for properly accommodating eggs. The illustrated tray unit contemplates a total of twelve receptacles 16 which are preferably identical in configuration and which are arranged in two parallel rows of six receptacles in each row to receive a dozen eggs. Outer parts 18 (FIG. 2) of the back row of receptacles constitute portions of the rear wall of the tray unit. Similar other parts of the receptacles constitute portions of the front and side walls of the tray unit. Lowermost parts 19 of the receptacles are coplanar and constitute portions of the bottom wall of the tray unit.

The tray unit includes a top wall 20 that is parallel to parts 19 and that extends laterally beyond the egg receptacles. The top wall is provided with a plurality of spaced, upstanding stop elements 21 (FIGS. 4, 5 and 7) which are aligned in a row that is parallel to and spaced inwardly from its front edge (FIG. 7). Integral with and extending upwardly along the outer periphery of top wall 20 is a continuous flange 22.

The central front portions of top wall 20 and flange 22 are recessed, as indicated at 23 and 24 (FIG. 7), to define a hollow catch member 25 of a latching means to be further described. Catch member 25 is provided with a depression 25'.

Cover unit C-1 is hollow and, as shown, has the general configuration of an inverted rectangular dish. This unit consists of three parts, namely a pair of spaced, identical, end parts 26 and an intermediate part 27 which is secured to the end parts. Parts 26 are made of a suitable transparent plastic composition, of the type referred to earlier herein, while part 27 is made of a suitable weight and grade paperboard.

Each cover part 26 is open at the bottom and at one side and comprises a side wall 28, a front wall 29, a top wall 30 and a rear wall 31 (FIG. 2). The free ends of the front, top and rear walls are offset inwardly to define a relatively shallow, inverted, U-shaped recess 32 (FIG. 3). The lower end of each end part 26 is provided with a lateral shoulder or flange 33 and a depending flange 34, both of which are generally U-shaped.

Cover part 27 is formed from a single piece of paperboard that is cut, bent, scored and folded to obtain a front wall 35, a top wall 36, a rear wall 37, and an attaching panel 38 having hinged triangular extensions 39. Panel 38 is hinged to rear wall 37 along a weakened line 40 (FIG. 2). Panel 38 and its extensions 39 are respectively secured to the underside of the top wall 36 of the tray unit and to parts 18 of the tray unit by a suitable adhesive.

Integral with cover front wall 35 is a latch member 41 that is hinged thereto along a score line 42. The latch member is cut out, as indicated at 43, to define a flexible tab 44 which registers with depression 25' when the latch member is in engagement with the catch member, as illustrated in FIGS. 1, 5 and 6.

It will be observed from an examination of the drawings that, when cover unit C-1 is in closed position relative to the tray unit T-1, flanges 33 bear against the upper edge of corresponding portions of flange 22 and depending flanges 34 are positioned outside of but closely adjacent to such portions of flange 22. Also, the free edge of cover front wall 35 is positioned between corresponding portions of flange 22 and stop elements 21.

The cover unit may be readily moved to open position by first releasing latch member 41 from catch member 25 and their imparting upward pivotal movement to the cover unit relative to the tray unit. Weakened hinge line 40 permits the cover unit to be readily detached from the tray unit, if and when desired.

Figure 9:
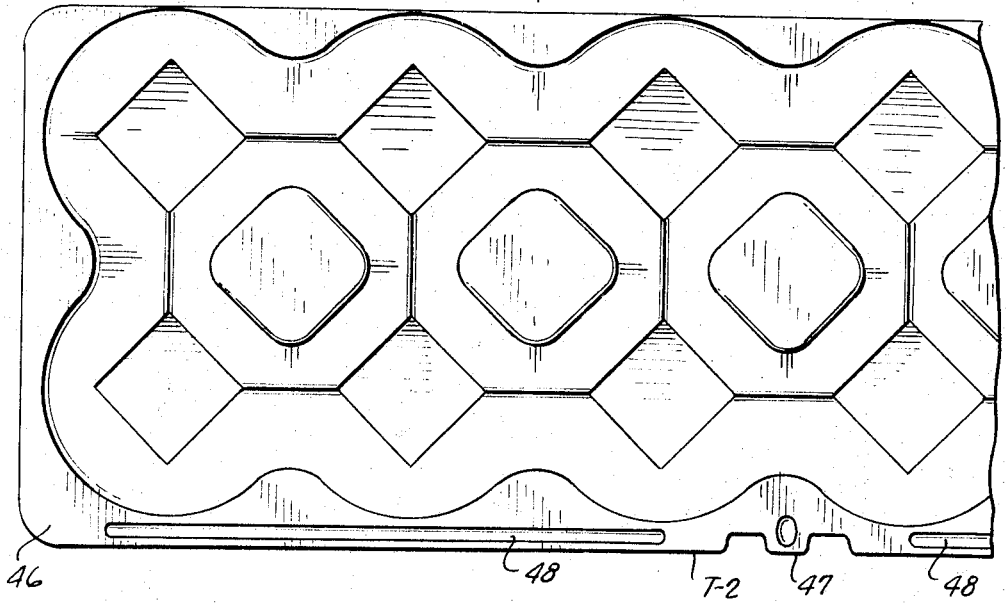
FIG. 9 is an enlarged top plan view of a portion of the tray unit of the carton shown in FIG. 8.
Figure 10:
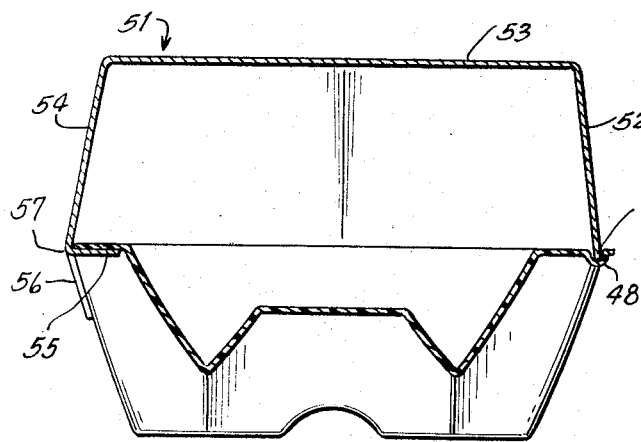
FIG. 10 is a view taken along line 10—10 of FIG. 8.

Reference is next had to FIGS. 8, 9 and 10 which illustrate another complete egg carton 45 embodying this invention. Carton 45 also consists of a pair of units, namely a tray unit T-2 and a cover unit C-2, each of which is similar to the corresponding units of earlier-described carton 15.

Tray unit T-2 differs over tray unit T-1 primarily in that its top wall 46 is devoid of an outer upstanding flange. The front portion of top wall 46 is provided with a catch member 47, that is similar to catch member 25, and is formed with a pair of elongated, aligned rectilinear grooves 48 which are arranged to opposite sides of catch member 47.

Cover unit C-1 consists of three parts, namely a pair of plastic end parts 50 and an intermediate paperboard part 51. Plastic end parts omit the flanges 33 and 34 which are elements of earlier-described end parts 26.

Intermedate paperboard part 51 is generally the same as paperboard part 27 and includes a front wall 52, a top wall 53, a rear wall 54 and an attaching panel 55 having triangular extensions 56. The rear wall of the cover unit is hinged to panel 55 along a weakened line 57 to permit of ready detachment of the cover unit from the tray unit.

Cover unit C-2 is provided with a latching member 58 that is generally the same as earlier-described latching member 41. Front wall 52 of the cover unit is provided with extensions 60 which project beyond the lower ends of plastic parts 50 and which are adapted to register with grooves 48 of the tray unit when the cover unit is in closed position relative to the tray unit.

In the embodiment of the invention shown in FIGS. 8, 9 and 10, plastic end parts 50 bear directly against the upper faces of corresponding portions of top wall 46 of the tray unit while cover extensions 60 register with grooves 48 to prevent undesirable inward or outward movement of the front wall of the cover unit. The illustrated arrangement of parts also prevents undesirable twisting of the cover unit relative to the tray unit when these units are in relative closed position, as shown.

From the foregoing, it is believed that the objects, advantages, construction and operation of the present invention will be readily comprehended by persons skilled in the art, without further description. Although the invention has been herein shown and described in several practicable forms, it is recognized that certain parts or elements thereof are representative of other parts or elements which may be used in substantially the same manner to accomplish substantially the same results. Therefore, it is to be understood that the invention is not to be limited to the exact details described herein, but is to be accorded the full scope and protection of the following claims.

I claim:

1. A carton comprising a tray unit and a cover unit, the tray unit comprising bottom, front, rear and side walls, the cover unit being hollow and open at the bottom and comprising a pair of spaced end parts which are made of a plastic composition and an intermediate part which is made of paperboard and which is secured at each end to a corresponding end part, said end and intermediate parts forming top, front, rear and side walls of the cover unit, said intermediate part including a panel which is hinged to the rear wall of the cover unit and is secured to the rear portion of the tray unit.

2. A carton comprising a tray unit and a cover unit, the tray unit comprising bottom, front, rear and side walls, a plurality of receptacles extending upwardly from the bottom wall and defining corresponding cells for receiving articles, such as eggs, and a top wall projecting laterally beyond at least the front and side walls, the cover unit being hollow and open at the bottom and comprising a pair of spaced end parts which are made of a plastic composition and an intermediate part which is made of paperboard and which is secured at each end to a corresponding end part, said end and intermediate parts forming top, front, rear and side walls of the cover unit, said intermediate part including a panel which is hinged to the rear wall of the cover unit and is secured to the rear portion of the tray unit.

3. A carton comprising a tray unit and a cover unit, the tray unit being of molded one-piece construction and comprising bottom, front, rear and side walls, a plurality of receptacles extending upwardly from the bottom wall and defining corresponding cells for receiving articles, such as eggs, and a top wall projecting laterally beyond at least the front and side walls, the cover unit being hollow and open at the bottom and comprising top, front, rear and side walls formed by a pair of spaced plastic end parts and an intermediate paperboard part which is secured at each end to a corresponding end part, each end part constituting a side wall of the cover unit and minor portions of the other walls of the cover unit, the intermediate part constituting the major portions of the top, front and rear walls of the cover unit, said intermediate part including a panel which is hinged to the rear wall of the cover unit and is secured to the rear portion of the tray unit.

4. A carton according to claim 3 wherein the tray unit comprises a plastic composition and wherein the end parts of the cover unit are transparent.

5. A carton according to claim 3 wherein the panel is hinged to the rear wall of the cover unit along a weakened line to permit detachment of the remainder of the cover unit from the tray unit.

6. A carton according to claim 5 wherein the panel is positioned beneath the top wall of the tray unit and is secured to the undersurface thereof.

7. A carton according to claim 6 wherein portions of the panel are secured to the rear wall of the tray unit.

8. A carton according to claim 3 including latching means comprising a catch member secured to the tray unit and a latch member secured to the cover unit, said latch member having an opening for receiving the catch member.

9. A carton according to claim 8 wherein the catch member is integral with the front portion of the top wall of the tray unit and the latch member is integral with and hinged to the front wall portion of the intermediate part of the cover unit.

10. A carton according to claim 3 wherein marginal portions of each end part which constitute said minor portions of the outer walls of the cover unit are offset inwardly and wherein each end of the intermediate part bears against corresponding marginal portions.

11. A carton according to claim 3 wherein the tray unit includes an upstanding flange along the marginal front and side portions of its top wall and wherein each end part of the cover unit includes an outwardly extending flange at its lower end and an outer flange depending therefrom, said outer flanges being disposed exterior and adjacent to corresponding portions of the upstanding flange when the cover unit is in closed position relative to the tray unit.

12. A carton according to claim 11 wherein said major portion of the front wall of the cover unit includes a free end portion which is positioned inwardly of the upstanding flange.

13. A carton according to claim 12 including stop means carried by the top wall of the tray unit and disposed to the side of said free end portion of the front wall of the cover unit which is remote from the upstanding flange.

14. A carton according to claim 3 wherein the front portion of the top wall of the tray unit includes at least one elongated groove and wherein said major portion of the front wall of the cover unit includes a free end portion which registers with the groove when the cover unit is in closed position relative to the tray unit.

15. A carton according to claim 14 wherein said free end portion of the front wall of the cover unit projects beyond the end parts of the cover unit.

16. A carton according to claim 15 wherein the side portions of the top wall of the tray unit are coplanar and the end parts of the cover unit bear thereon.

No references cited.

JOSEPH R. LECLAIR, *Primary Examiner.*

R. PESHOCK, *Assistant Examiner.*